United States Patent [19]

Clark

[11] 4,179,967

[45] Dec. 25, 1979

[54] VARIABLE TOOTH SAW BLADE

[75] Inventor: Calvin M. Clark, Bernardston, Mass.

[73] Assignee: Stanadyne, Inc., Windsor, Conn.

[21] Appl. No.: 937,549

[22] Filed: Aug. 28, 1978

[51] Int. Cl.² .................... B23D 61/12; B27B 33/02
[52] U.S. Cl. ................................. 83/846; 83/848; 83/852; 83/661
[58] Field of Search .............. 83/835, 846, 845, 844, 83/847, 848, 849, 850, 851, 852, 661

[56] References Cited

U.S. PATENT DOCUMENTS

| | | | |
|---|---|---|---|
| 2,534,424 | 12/1950 | Dryden | 83/846 |
| 2,568,870 | 9/1951 | Ronan | 83/846 |
| 2,682,098 | 6/1954 | Wilcox | 83/846 |

*Primary Examiner*—Donald R. Schran

*Attorney, Agent, or Firm*—Prutzman, Kalb, Chilton & Alix

[57] ABSTRACT

A saw blade is provided with an arrangement and form of teeth which reduces vibration, cutting noise and chatter, and which enhances cutting speed and blade life. In addition to having teeth arranged in recurrent groups wherein the teeth alternately decrease and increase in gullet depth and pitch with the tips of the teeth in alignment and being set laterally to the same extent, the smaller teeth are given a positive rake angle which increases with decrease in tooth size so that the angle of attack of the smaller teeth is sharper thereby causing them to dig in and remove a larger clip, thereby tending to equalize the size of the chips removed by the different teeth.

10 Claims, 4 Drawing Figures

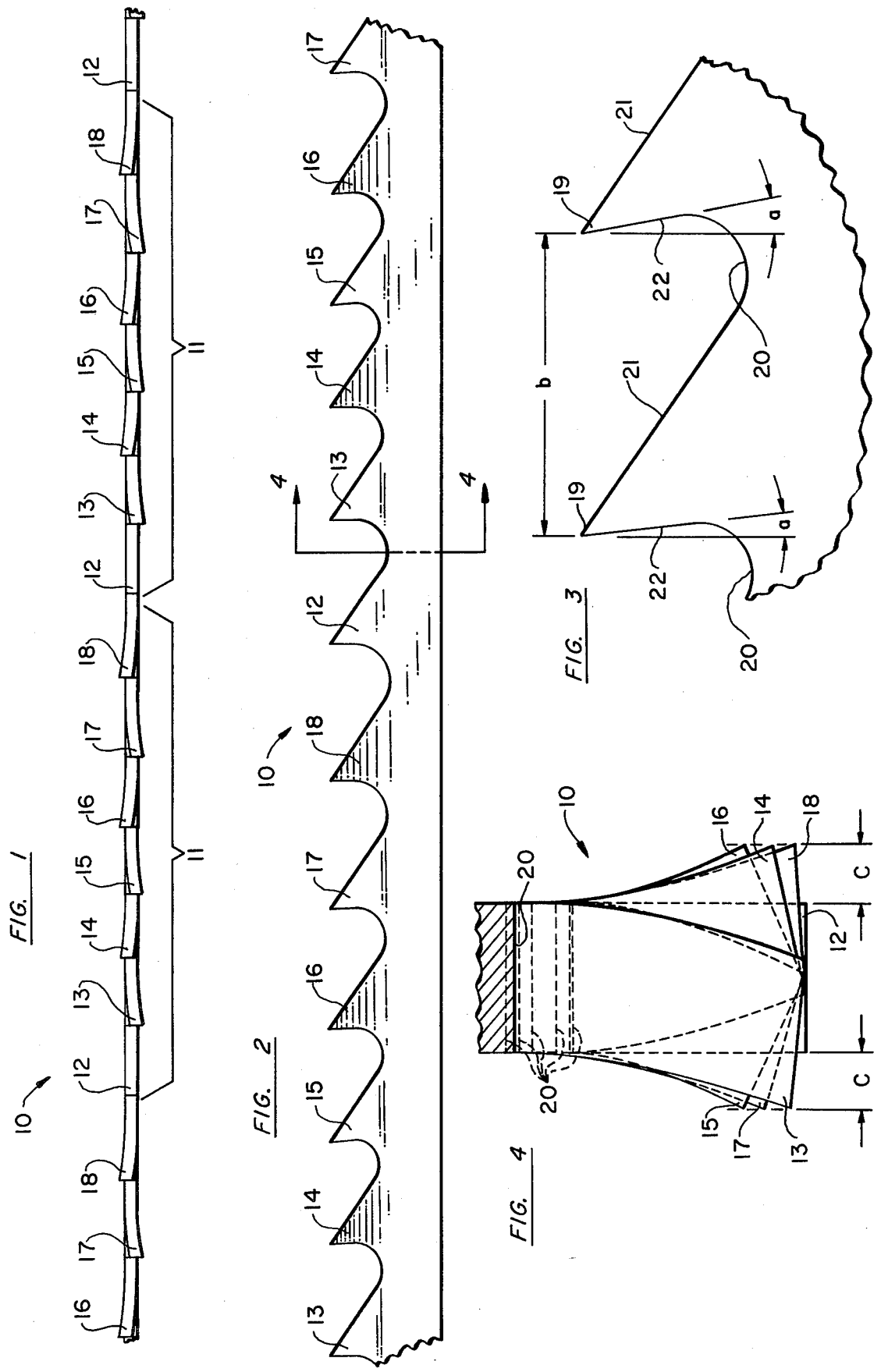

VARIABLE TOOTH SAW BLADE

BACKGROUND AND SUMMARY OF THE INVENTION

The present invention relates to saw blades of the type used for cutting metal workpieces, such as band saw blades and hack saw blades. The invention relates more particularly to blades of this type having a novel form and arrangement of teeth which renders the blade smoother running and faster cutting and prolongs its operating life.

It has long been recognized that metal cutting blades of the conventional type which are characterized by being formed with teeth of uniform size and pitch throughout, tend to vibrate and be noisy in operation. In order to overcome these difficulties, and increase the wearing qualities of the blade, it has been proposed heretofore to form the saw with teeth of varying size and pitch as, for example, in accordance with the disclosure in U.S. Pat. No. 2,568,870 issued Sept. 25, 1951, wherein the teeth are arranged in groups which alternately increase progressively in gullet depth and pitch and then decrease progressively in gullet depth and pitch. While this arrangement does improve the functioning of the blade from a vibration and wear standpoint, it has the disadvantage of limiting the cutting speed of the blade. Normally, a decrease in speed can be avoided in accordance with the prior art by increasing the size and pitch of the teeth to the limits prescribed by the thickness of the material being cut and the desired surface finish. However, in a blade having teeth of varying size and pitch this limit applies to the size and pitch of the largest tooth, and since the remaining teeth are smaller in size and pitch, optimum citting speed cannot be attained and thus, the blade cuts more slowly.

Accordingly, it is an object of the invention to provide a saw blade of the type having teeth of variable length and pitch but without the disadvantage of poor cutting speed.

Another object is to improve saw blades of this type so as to obtain optimum operating characteristics such as reduced cutting noise and chatter, reduced vibration and smoother running, less heat generation, and longer blade life.

Other objects will be in part obvious and in part pointed out in more detail hereinafter.

A better understanding of the invention will be obtained from the following description and the accompanying drawing of an illustrative application of the invention.

BRIEF DESCRIPTION OF THE DRAWINGS

In the drawings:

FIG. 1 is an edge view of the toothed edge of a saw blade segment embodying the invention;

FIG. 2 is an enlarged side view of a portion of the saw blade segment shown in FIG. 1;

FIG. 3 is fragmentary further enlarged side view of two teeth of the saw blade segment; and FIG. 4 is a cross-sectional view of the saw blade taken along the lines 4—4 of FIG. 2.

DESCRIPTION OF THE PREFERRED EMBODIMENT

Referring to the drawings in detail, the saw blade segment 10 shown in the drawing is an example of a band saw blade embodying the invention. The invention can also be embodied in other metal cutting saw blades such as hack saw blades.

The saw blade embodying the invention is characterized by having a plurality of recurrent groups of teeth indicated by the brackets 11 in which each group 11 comprises a sequence or series of different teeth denoted by the reference numerals 12 through 18, respectively. As explained more fully hereinafter, the teeth 12–18 differ from each other, not only in size, in pitch, and in angle of bend, but also in rake angle, all in a predetermined relationship. The outer tips or points 19 of all the teeth are in substantial alignment, the difference in size of the teeth being attained by variations in the depth of the gullets indicated at 20. When the teeth are milled, the trailing edges 21 of the teeth are parallel and therefore, any increase in the depth of the gullet automatically increases the pitch or distance between the tips 19 of the adjacent teeth as indicated by the reference letter b in FIG. 3, and vice versa.

Starting with the largest tooth 12 it will be seen that it is unset, i.e., it is not bent out of the plane of the blade, and thus it functions as a raker tooth. In the preferred embodiment of the invention, this tooth 12 is formed with zero rake with its forward edge 22 at right angles to the longitudinal axis of the blade 10.

The next tooth 13 has a slightly smaller gullet than tooth 12 and consequently has a shorter pitch as measured by the distance b from its tip 19 to the tip 19 of tooth 12. Tooth 13 is set by being bent out of the plane of the blade 10 as denoted by the reference letter c in FIG. 4. In the specific example, it is bent to the left as viewed in FIG. 4. The forward edge 22 of tooth 13 is inclined slightly forwardly, thus giving the tooth a slight positive rake angle denoted by the reference letter a, FIG. 3.

Tooth 14 is slightly smaller than tooth 13 with a slightly shorter pitch and it is set by being bent in the alternate direction to tooth 13. It extends outwardly from the plane of the blade 10 substantially the same amount as tooth 13, but in the opposite direction. Being slightly smaller than tooth 13 requires that it be bent at slightly sharper angle in order to extend outwardly the same amount. Tooth 14 also has a positive rake angle a and this is made slightly greater than the positive rake angle of the larger tooth 13.

Tooth 15 is the smallest tooth of all and has the shortest pitch. It is set outwardly the same amount and in the same direction as tooth 13, but because it is smaller it is bent outwardly at a sharper angle. Tooth 15, being the smallest tooth, also has the largest positive rake angle.

Tooth 16 is made slightly larger than tooth 15 and consequently has a greater pitch. It is set outwardly the same amount and in the same direction as tooth 14, being bent outwardly at a lesser angle. It has a positive rake angle a which is slightly less than that of tooth 15.

Tooth 17 is slightly larger than tooth 16 with a larger pitch and is set outwardly the same amount and in the same direction at tooth 15. Being longer than tooth 15, it is bent at a lesser angle. The rake angle is made less than that of tooth 16.

Tooth 18 is formed slightly larger and with a greater pitch than tooth 17 but it is smaller and has a smaller pitch than the succeeding tooth 12 which is a duplicate of the larger raker tooth first described. It is set in the same direction and to the same outward distance as tooth 16 although it has a lesser angle of bend. The positive rake angle a is made slightly less than that of tooth 17.

As stated in the preceding description of the specific embodiment of a saw blade formed in accordance with the invention, the variation in tooth length as between adjacent teeth is only a small amount. In fact, in a typical saw blade of this design, the difference in tooth size as between adjacent teeth is generally only a few hundredths of an inch and usually does not exceed about two hundredths of an inch. Inasmuch as it is intended, in accordance with the invention, to vary the rake angle of the teeth in some relationship to the change in tooth length, and preferably at least roughly proportional thereto, the difference in rake angle as between adjacent teeth is also made small. The difference in rake angle as between adjacent teeth normally is only a few degrees and usually does not exceed about two degrees. While it is not intended to limit the invention to any specific tooth dimensions, the following table provides a specific example of the dimensions of a sample band saw blade of the type illustrated in the drawing.

| Tooth Reference Numeral | Gullet Depth (In inches) | Tooth Pitch (In inches) | Rate Angle (In degrees) |
|---|---|---|---|
| 12 | .1031 | .230 | 0 |
| 13 | .0972 | .210 | 2 |
| 14 | .0904 | .190 | 3 |
| 15 | .0842 | .170 | 5 |
| 16 | .0892 | .185 | 4 |
| 17 | .0941 | .200 | 3 |
| 18 | .0983 | .215 | 1 |

In addition to variations in the dimensions of the teeth, it is realized that for some uses of the saw blade, it may be advantageous to depart from the specific arrangement, number and/or form of the teeth making up the series of teeth in each recurrent tooth group 11. While the composition of the groups 11 as shown and described in connection with the specific embodiment is one of the preferred patterns and believed to be optimum for a general all-purpose saw blade, it is contemplated that variations will be made within the scope of the invention.

As compared with prior art saw blades having teeth of varying gullet depth and pitch, saw blades formed in accordance with the invention have a greatly improved cutting speed so that they are more efficient and economical to use. In addition, they not only retain the advantages of quiet operation and reduction of vibration and the lack of cadence resulting from the variable pitch or spacing of the teeth, but in fact are even quieter and freer of vibration resulting in a smoother running saw. It also has been found that blade life is significantly increased, possibly as a result of the quieter action and accompanying reduction in heat generation. While it is not intended to limit the invention to any particular theory of operation, nevertheless it is believed that by varying the rake angle of the teeth in a relationship to variations in tooth size so that the smaller teeth are rendered more able to dig in and remove a larger chip more comparable in size to that removed by the larger teeth, this not only increases the overall cutting speed, but also balances out the impacts on the individual teeth resulting in the improved smooth and quiet operation which characterizes the blades of the present invention.

As will be apparent to persons skilled in the art, various modifications, adaptations, and variations of the foregoing specific disclosure can be made without departing from the teachings of the present invention.

I claim:

1. A saw blade having a toothed edge comprising a plurality of recurrent groups of teeth; each group including a series of teeth which are set angularly and alternately sidewise the same amount and which first decrease progressively in gullet depth and pitch and then increase progressively in gullet depth and pitch, said teeth having varying rake angles, the shorter teeth having a more positive rake angle than the longer teeth.

2. A saw blade as defined in claim 1 wherein the increases and decreases in the positive rake angles of the teeth are roughly proportional to the decreases and increases in the pitches of the teeth.

3. A saw blade as defined in claim 1 wherein each series of teeth also includes at least one unset raker tooth.

4. A saw blade as defined in claim 3 wherein an unset raker tooth is the end tooth of the series.

5. A saw blade as defined in claim 2 in which each series of teeth includes at least one larger tooth which is unset and functions as a raker tooth.

6. A saw blade as defined in claim 3 wherein the increases or decreases in pitch between adjacent teeth do not exceed about two hundredths of an inch and the increases or decreases in rake angles between adjacent teeth do not exceed about two degrees.

7. A saw blade as defined in claim 3 wherein the series of teeth preceding the raker tooth consists of six teeth, the first three of which decrease progressively in gullet depth and pitch and the following three of which increase progressively in gullet depth and pitch.

8. A saw blade as defined in claim 7 wherein the increases and decreases in the positive rake angles of the teeth are roughly proportional to the decreases and increases in the sizes of the teeth.

9. A saw blade having a toothed edge comprising a plurality of recurrent groups of teeth, each group comprising a series of teeth of varying gullet depth and pitch, the largest tooth being an unset last tooth of the group and being preceded by the remaining teeth of the series which first decrease progressively in gullet depth and pitch and then increase progressively in gullet depth and pitch, the remaining teeth being set angularly and alternately sidewise an amount sufficient so that said remaining teeth all extend laterally to the same extent so as to cut a uniform key throughout, said remaining teeth being formed with a positive rake angle which increases as the size of the tooth decreases and decreases as the size of the tooth increases.

10. A saw blade as defined in claim 9 wherein the rake angle of said remaining teeth is varied in an amount tending to equalize the size of the chips removed by the individual teeth.

* * * * *